United States Patent
Freis et al.

(10) Patent No.: US 9,573,186 B2
(45) Date of Patent: Feb. 21, 2017

(54) METHOD OF FASTENING VEHICLE PARTS

(71) Applicant: FORD GLOBAL TECHNOLOGIES, LLC, Dearborn, MI (US)

(72) Inventors: Amanda Kay Freis, Ann Arbor, MI (US); Jina Kim, Ann Arbor, MI (US); Aindrea McKelvey Campbell, Beverly Hills, MI (US); David Edward Paul, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 14/317,693

(22) Filed: Jun. 27, 2014

(65) Prior Publication Data
US 2015/0375795 A1 Dec. 31, 2015

(51) Int. Cl.
*B21J 15/02* (2006.01)
*B21J 15/36* (2006.01)
*B62D 25/04* (2006.01)
*B62D 25/14* (2006.01)

(52) U.S. Cl.
CPC ............ *B21J 15/025* (2013.01); *B21J 15/36* (2013.01); *B62D 25/04* (2013.01); *B62D 25/14* (2013.01)

(58) Field of Classification Search
CPC ............ B21J 15/025; B21J 15/36; B60P 3/04; B60P 3/34; B60P 7/0807; B21D 39/021; B21D 53/88; B21D 19/12; B21D 22/022; B21D 35/001; B21D 37/16
USPC ................... 296/191, 193, 193.05, 24.3, 29, 178,296/181.1; 29/243.53, 432.2, 524.1, 798
See application file for complete search history.

(56) References Cited

U.S. PATENT DOCUMENTS

| | | | | |
|---|---|---|---|---|
| 2,145,758 | A * | 1/1939 | Fellows | B60K 15/0406 220/822 |
| 5,433,571 | A * | 7/1995 | Allison | A44B 1/42 411/373 |
| 6,962,469 | B2 * | 11/2005 | Wang | B21J 15/025 411/501 |
| 7,252,469 | B2 * | 8/2007 | Zaluzec | B62D 23/00 411/34 |
| 7,284,319 | B2 * | 10/2007 | Kato | B21J 15/025 29/243.53 |
| 8,763,233 | B2 * | 7/2014 | Bartig | F16B 19/086 29/432 |
| 2008/0309145 | A1 * | 12/2008 | Brandtner | A47C 31/026 297/463.1 |
| 2013/0076071 | A1 * | 3/2013 | Morden | B62D 25/081 296/192 |

(Continued)

FOREIGN PATENT DOCUMENTS

| | | |
|---|---|---|
| JP | 2009142889 A | 7/2009 |
| WO | 2014013232 A1 | 1/2014 |

*Primary Examiner* — Glenn Dayoan
*Assistant Examiner* — Sunsurraye Westbrook
(74) *Attorney, Agent, or Firm* — Jason C. Rogers; Brooks Kushman P.C.

(57) ABSTRACT

An improved joining process interlocks parts together and avoids breakthrough in joints that would otherwise be infeasible. The process is used to join a relatively thin rear part to a relatively thick front part. A dedicated backer plate is joined to the front and rear parts such that the rear part is sandwiched between the front part and the backer plate. The front part, rear part, and backer plate are plastically deformed to establish interlock by insertion of a self-piercing rivet, clinching, or insertion of a flow drill screw.

4 Claims, 6 Drawing Sheets

(56) References Cited

U.S. PATENT DOCUMENTS

2013/0273314 A1\* 10/2013 Campbell ................. B32B 7/08
428/138

\* cited by examiner

METHOD OF FASTENING VEHICLE PARTS

TECHNICAL FIELD

This disclosure relates to the field of vehicles construction. More particularly, the disclosure pertains to a method of fastening vehicle parts.

BACKGROUND

Pickup trucks are motor vehicles with a rear open top cargo area often referred to as a bed. Pickup trucks are popular largely because the bed allows them to be utilized in so many different ways, including carrying a variety of types of cargo and towing various types of trailers. Traditionally the majority of body structures on pickup trucks have been formed from steel alloys. Through years of experience, pickup truck designers have learned how to design steel truck body parts that withstand the variety of demanding pickup truck applications. The current regulatory and economic environment have increased the importance of making pickup trucks more fuel efficient as well as functional and durable. One way to reduce the fuel consumption of a vehicle, especially when unloaded, is to reduce vehicle structure weight.

Aluminum alloys typically have a higher strength to weight ratio than steel alloys. Consequently, replacing steel with aluminum for various vehicle parts offers the potential for weight reduction. However, the elastic modulus of aluminum is generally lower than the elastic modulus of steel. As well, fabrication techniques and methods of joining parts that work well for steel parts may not work well for the same aluminum part. Due to these and other differences, simple material substitution does not necessarily produce an acceptable design. Various methods of joining vehicle parts together to form a vehicle structure are known, each having advantages and disadvantages. Some methods are not suitable for joining a part made of one material to a part made of a different material.

One method suitable for joining parts, including parts made of distinct materials, is a self-piercing rivet process. A self-piercing rivet process is depicted in FIGS. 1 and 2. A stack of parts, including a front part 10 and a rear part 12, is clamped between a die 16 and a blankholder 18. The die includes a protrusion 20. A rivet 22 is forced into the stack by a punch 24. In FIG. 1, the rivet 22 has just begun to deform the materials in the stack. In FIG. 2, the rivet has been forced into the stack far enough that the head of the rivet is approximately flush with the top surface of the front part 10, plastically deforming the front part 10 and the rear part 12. The material that has been pushed into the die during the process is called a button. FIG. 3 shows a cross section through the button. Notice that the rivet 24 has pierced the front part 10 and extends into rear part 12 while splaying open. Mechanical interlock is generated by this rivet splay, where one measure of interlock can be described as the difference in diameters, D2 and D1, divided by 2. D1 is the diameter of the rivet at the interface between the front part 10 and the rear part 12. D2 is the maximum diameter of the splayed rivet tail.

Two failure modes may be encountered in the self-piercing rivet process. In one failure mode, the diameter relationship necessary to interlock the parts is not established. In some circumstances, the non-interlock failure mode may be addressed by using a longer rivet. In a second failure mode, the rear part ruptures at the base of the button. This may expose a surface that is sensitive to corrosion. Also, adhesive that may be applied between the parts may be forced out through the rupture and may collect on the protrusion 20 of the die 16, impacting future joints unless cleaned. In some circumstances, this second failure mode, called breakthrough, may be addressed by using a shorter rivet. In some circumstances, however, such as when the rear part is thin relative to the front part, a rivet long enough to achieve interlock is too long to avoid breakthrough. Consequently, the self-piercing rivet process has traditionally been limited to joints in which the rear part is relatively thick.

SUMMARY

A method of attaching a rear part to a front part includes clamping the rear part between the front part and a dedicated backer plate and applying force to the front part to plastically deform the parts and backer plate to establish interlock. In a self-piercing rivet process, for example, the force is applied by inserting a rivet through the front and rear parts into the backer plate. Interlock is established as the rivet splays open during rivet insertion such that a rivet diameter at the interface between the rear part and the backer plate is less than a diameter of the rivet deeper into the backer plate. In the self-piercing rivet process, the material that extends into the backer plate is the rivet. The process is applicable where the rear part would rupture, called breakthrough, if a long enough rivet to achieve interlock were employed without the backer plate. This process may be employed in combination with use of adhesive. The method may be applicable to joints in which the rear part is thinner than the front part, the rear part is less than 1.5 mm thick, or the front part is greater than 3.0 mm thick. The method may be applicable when the rear part is fabricated from a laminate.

In another embodiment, a method of attaching a thin rear part to a thicker front part includes clamping the rear part between the front part and a backer plate thicker than the rear part to form a stack and forcing a fastener into the stack. The fastener may be, for example, a self-piercing rivet.

A vehicle sub-assembly includes a cowl side panel, a backer plate, a dash panel sandwiched between the cowl side panel and backer plate, and a rivet extending through the cowl side panel and the dash panel into the backer plate. The dash panel may be thinner than the cowl side panel. The cowl side and backer plate may be aluminum. The dash panel may be a steel laminate structure. The rivet may also extend through a hinge pillar.

DETAILED DESCRIPTION

Embodiments of the present disclosure are examples and other embodiments may take various and alternative forms. The figures are not necessarily to scale and some features may be exaggerated or minimized to show details of particular components. The specific structural and functional details disclosed are not to be interpreted as limiting, but merely as a representative basis for teaching one skilled in the art how to utilize the present invention. Various features illustrated and described with reference to any one of the figures can be combined with features illustrated in one or more other figures to produce embodiments that are not explicitly illustrated or described. Combinations and modifications of features consistent with the teachings of this disclosure could be used for particular applications or implementations.

Figure 1:
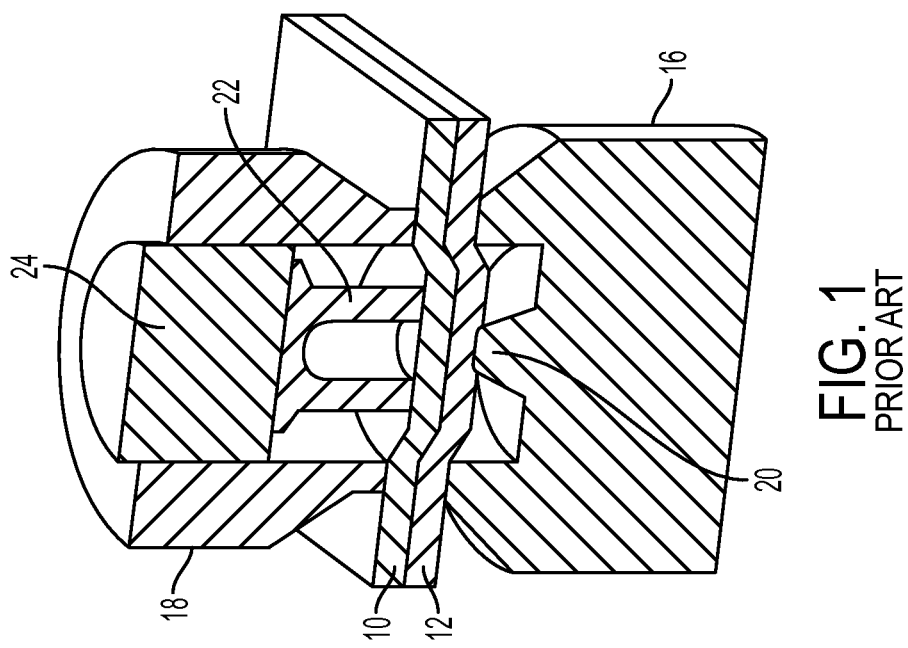
FIG. 1 is a cut-away view of an initial stage of a self-piercing rivet being inserted into a stack of parts in accordance with the prior art.
Figure 2:
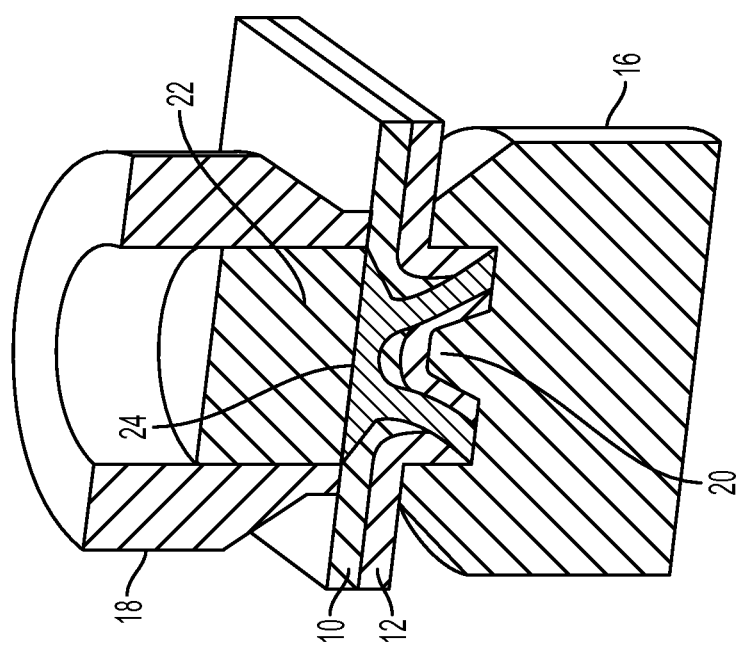
FIG. 2 is a cut-away view of a final stage of a self-piercing rivet being inserted into a stack of parts in accordance with the prior art.
Figure 3:
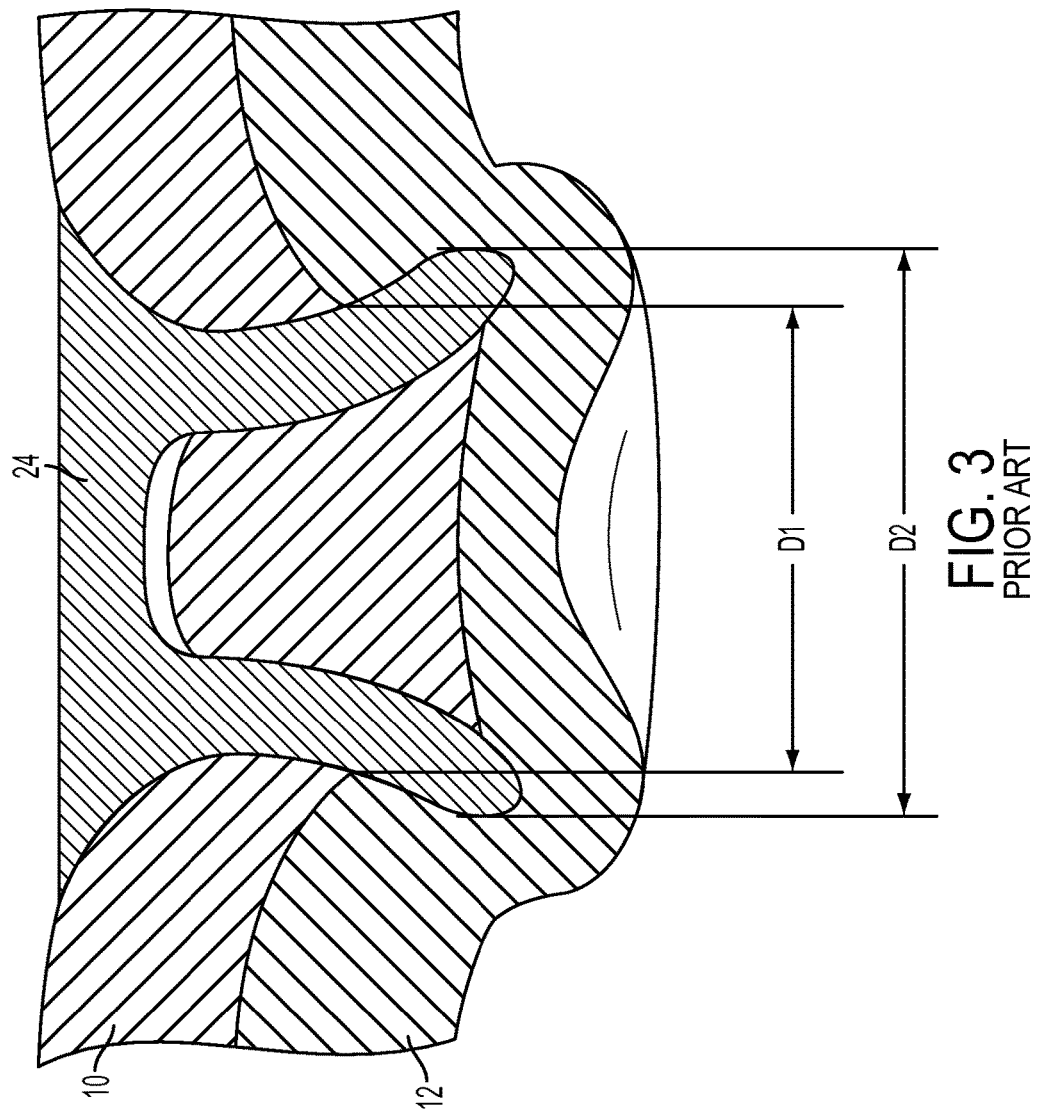
FIG. 3 is a cross sectional view of a self-piercing rivet joint with interlock in accordance with the prior art.
Figure 4:
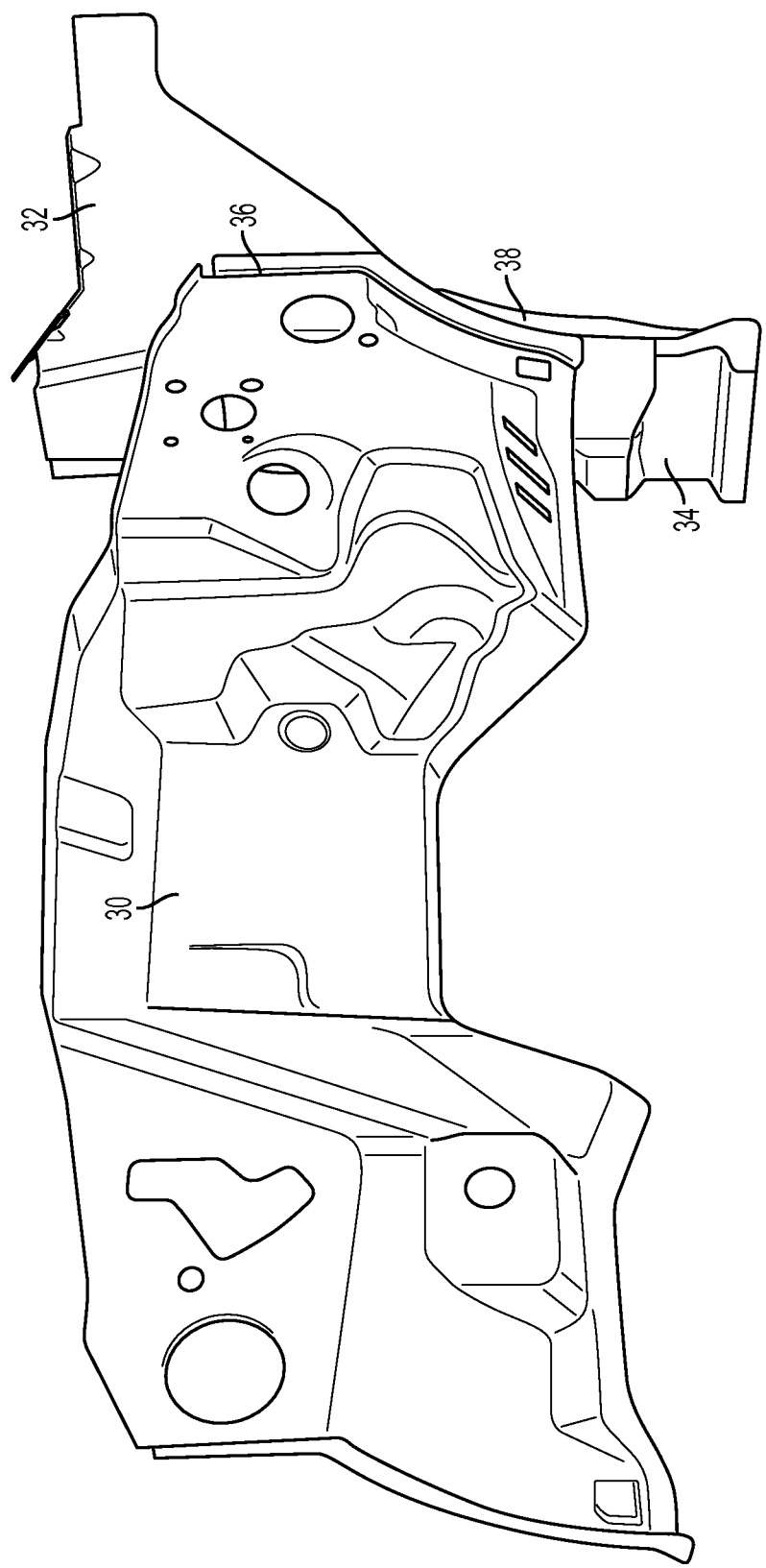
FIG. 4 is a pictorial view of an automotive sub-assembly including a cowl side panel, a dash panel, and a hinge pillar.

FIG. 4 shows an assembly including a dash panel 30, a cowl side panel 32, and a hinge pillar 34. The dash panel 30 is stamped from a steel laminate in which two thin layers of steel are bonded together. Cowl side panel 32 is stamped from 5754-O aluminum alloy stock and hinge pillar 34 is stamped from 6111-T4 aluminum alloy stock. These panels could be made from other 5000 and 6000 series aluminum alloys. Dash panel 30 and cowl side panel 32 are to be joined to one another in the region 36. In this region, dash panel 30 is less than 1.5 mm thick and cowl side panel 32 is 2.0 mm thick. Dash panel 30, cowl side panel 32, and hinge pillar 34 are to be joined to one another in the region 38. In this region, dash panel 30 and cowl side panel 32 have the same thicknesses as described above and hinge pillar 34 is greater than 2.0 mm thick. Dash panel 30 is too thin in this region to serve as a rear part for a self-piercing rivet process.

By adding a dedicated backer plate, a self-piercing rivet process achieves interlock without breakthrough for joints that otherwise would have encountered one of the two failure modes. A dedicated backer plate is a discrete part that is joined to the rear part and other parts in the stack but is otherwise not unattached and has no function other than to make the joint robust and to make the manufacturing assembly process feasible. A revised self-piercing rivet process employing a backer plate may produce feasible joints for joints with front parts thicker than 3.0 mm, for joints with rear parts thinner than 1.5 mm, and for joints in which the rear part is thinner than the front part.

Figure 5:
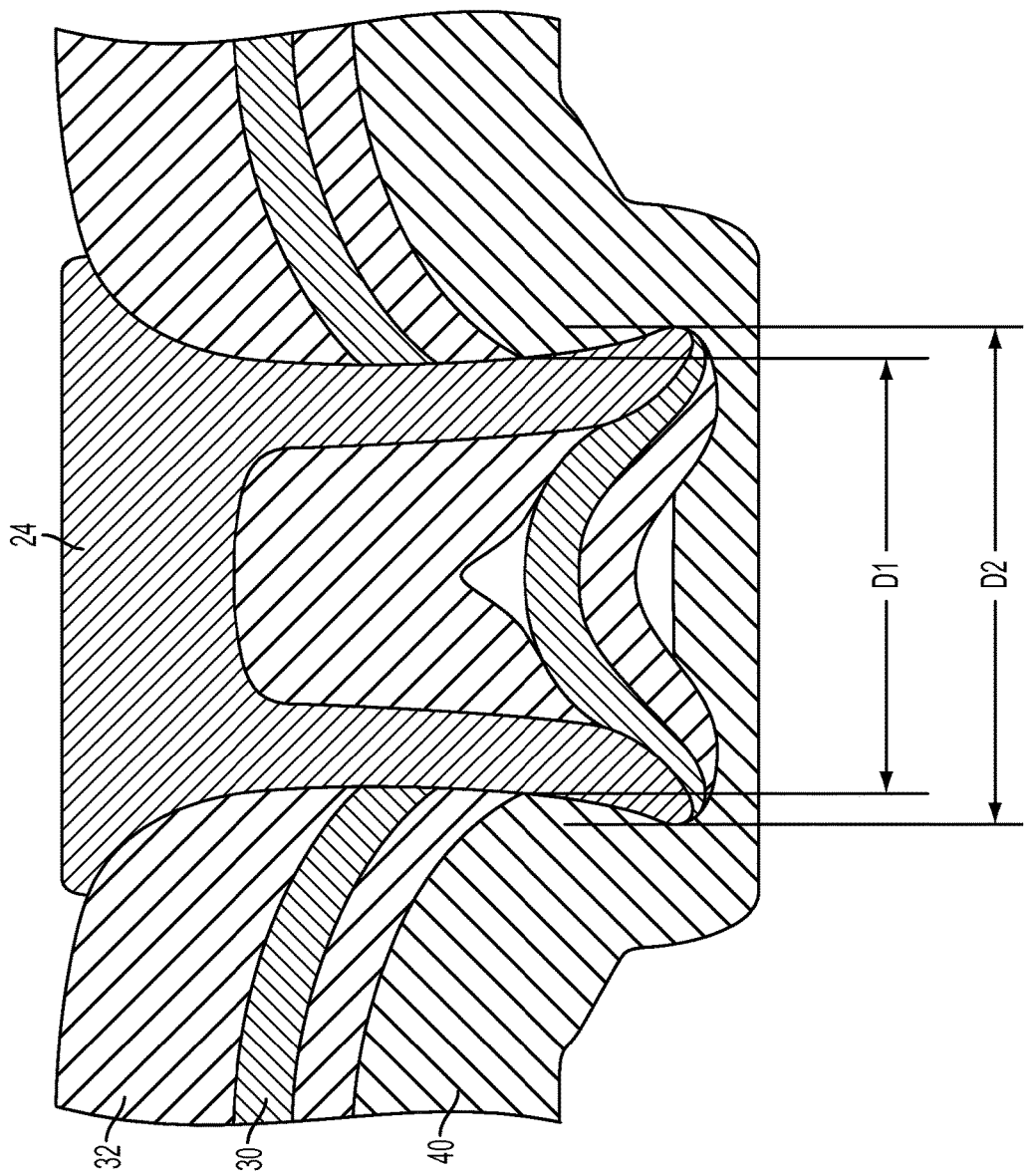
FIG. 5 is a cross sectional view of a first self-piercing rivet joint within the sub-assembly of FIG. 4 incorporating a dedicated backing plate in accordance with an embodiment of this disclosure.
Figure 6:
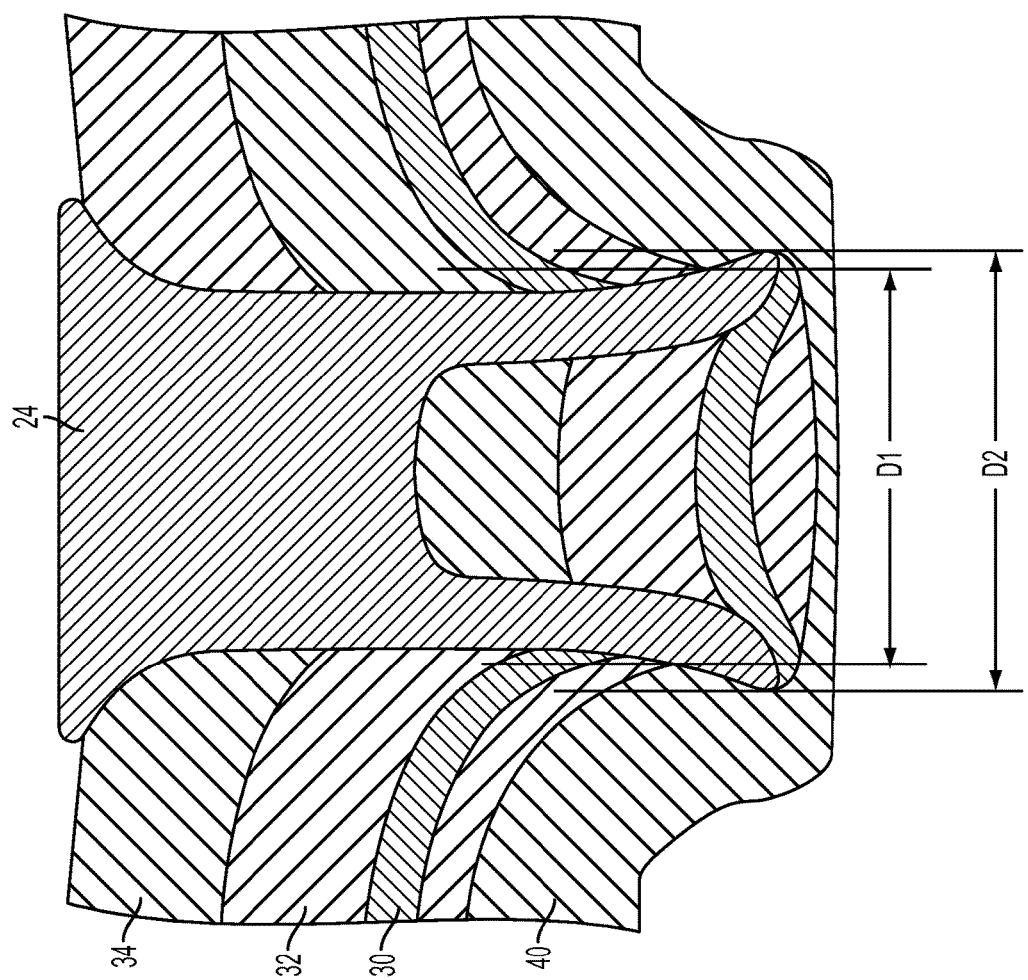
FIG. 6 is a cross sectional view of a second self-piercing rivet joint within the sub-assembly of FIG. 4 incorporating a dedicated backing plate in accordance with an embodiment of this disclosure.

In the revised process for region 36, dash panel 30 is clamped between cowl side panel 32 and dedicated backer plate 40. The rivet is then forced through cowl side panel 32, the front part, and dash panel 30, the rear part, into backer plate 40. A cross section of the resulting joint when the backer panel is 2.5 mm thick and made of 5000 or 6000 series aluminum alloy is shown in FIG. 5. An acceptable joint with interlock is achieved with a backer panel 3.0 mm thick. Breakthrough, an undesirable failure mode, is absent. In the revised process for region 38, the stack includes hinge pillar 34, cowl side panel 32, dash panel 30, and dedicated backer plate 40. The rivet is then inserted through hinge pillar 34, cowl side panel 32, and dash panel 30, into backer plate 40. A cross section of the resulting joint when the backer panel is 2.5 mm thick and made of 5000 or 6000 series aluminum alloy is shown in FIG. 6.

Adding a dedicated backing plate may also make clinched joints feasible for applications in which the rear part would otherwise be excessively thin. A clinching process is similar to the self-piercing rivet process described above except that no rivet is inserted. In a clinching process, the front piece is forced into the rear piece via a punch such that interlock is established as material flows into an anvil or die. In a revised clinching process, the front piece is forced into the dedicated backer plate to establish interlock.

Adding a dedicated backing plate may also make a flow drill screw joint feasible for applications in which the rear part would otherwise be excessively thin. In the flow drilling process, a screw is forced through the stack by an insertion tool. The insertion tool rotates the screw while simultaneously applying an axial force into the stack. Pre-drilling a pilot hole or clearance hole in the sheet metal assembly may not be necessary for joint feasibility. The flow drill screwing process temporarily softens the material local to the joint site as the screw rotates at high speed. Threads are formed in situ during the joining process. Since a threaded joint is formed, the screw may be removed and then re-installed or replaced with another screw. If the rear part is too thin, the subsequent lack of thread engagement may be inadequate to properly join the materials. On the other hand, if a dedicated backer plate is added to the stack behind the rear part, sufficient threads are established in the backer plate.

While exemplary embodiments are described above, it is not intended that these embodiments describe all possible forms encompassed by the claims. The words used in the specification are words of description rather than limitation. It is understood that various changes can be made and the features of various embodiments can be combined to form further embodiments of the invention that may not be explicitly described or illustrated. While various embodiments are described as providing advantages or being preferred over other embodiments or prior art implementations, those of ordinary skill in the art should recognize that one or more features or characteristics can be compromised to achieve desired overall system attributes that depend on the specific application and implementation. Embodiments described as less desirable than other embodiments or prior art implementations with respect to one or more characteristics are not outside the scope of the disclosure and can be desirable for particular applications.

What is claimed is:

1. A vehicle comprising:
   a cowl side panel;
   a backer plate;
   a dash panel sandwiched between the cowl side panel and backer plate; and
   a rivet extending through the cowl side panel and the dash panel into the backer plate, the rivet having a first diameter at an interface of the dash panel and backer plate and having a second diameter deeper into the backer plate, the second diameter being greater than the first diameter.

2. The vehicle of claim 1 wherein the dash panel has a thickness less than a thickness of the cowl side panel and less than a thickness of the backer plate.

3. The vehicle of claim 1 wherein the backer plate and cowl side panel are aluminum and the dash panel is a steel laminate.

4. The vehicle of claim 1 further comprising a hinge pillar wherein the rivet also extends through the hinge pillar.

* * * * *